Aug. 17, 1965  D. L. ROTH  3,201,573
FUEL DEMAND METER WITH POWER FAILURE INDICATING DEVICE
Filed Feb. 19, 1962

INVENTOR.
DONALD L. ROTH
BY
*Clyde C. Blinn*
ATTORNEY

United States Patent Office 3,201,573
Patented Aug. 17, 1965

3,201,573
FUEL DEMAND METER WITH POWER FAILURE INDICATING DEVICE
Donald L. Roth, Minneapolis, Minn., assignor to Honeywell Inc., a corporation of Delaware
Filed Feb. 19, 1962, Ser. No. 173,902
1 Claim. (Cl. 235—151)

The present invention is concerned with computer apparatus for providing an indication indicative of the heating load of a building; in particular a counting device provides an indication representative of the fuel consumption of a building depending upon the outdoor weather conditions.

For many years fuel or home heating oil supplying companies have used various means to estimate the fuel consumption of buildings. Such estimations are needed to maintain deliveries of fuel to customers on a "keep fill" basis where the fuel storage tanks of the customers are constantly filled without the customer paying any attention to the amount of fuel in their storage tanks. Many systems have been devised for assisting in maintaining the "keep fill" service. These systems generally are of the analog type which have a device responsive to the weather conditions of which the average building is exposed to give some sort of running indication of the expected heat loss of the average building. From this information the fuel consumption for a particular customer can be estimated and certain periods of time can be set for future deliveries of fuel to the customer.

While there are systems available, no particular system has been generally accepted and shown to provide a representative indication of the amount of fuel which would be consumed by a heating plant of a building. The applicant has made a very thorough study of conditions affecting various systems presently on the market and with the information attained the present invention was conceived.

The invention comprises a counting device which is energized by an outdoor unit responsive to weather conditions to give a time-temperature integration for energizing a counter mechanism. In addition to the indication of fuel consumption, a novel power failure indicator is provided which only responds to a power failure taking place over a period of time which would present an error of an unacceptable amount.

An object of the present invention is to provide a simple and inexpensive fuel indicator with an outdoor unit having a temperature responsive element for energizing an indoor counter depending upon the outdoor temperature for a selected period of time and a power failure indicator.

The object of the present invention will become apparent upon the study of the specification and drawing of which:

Figure 1:
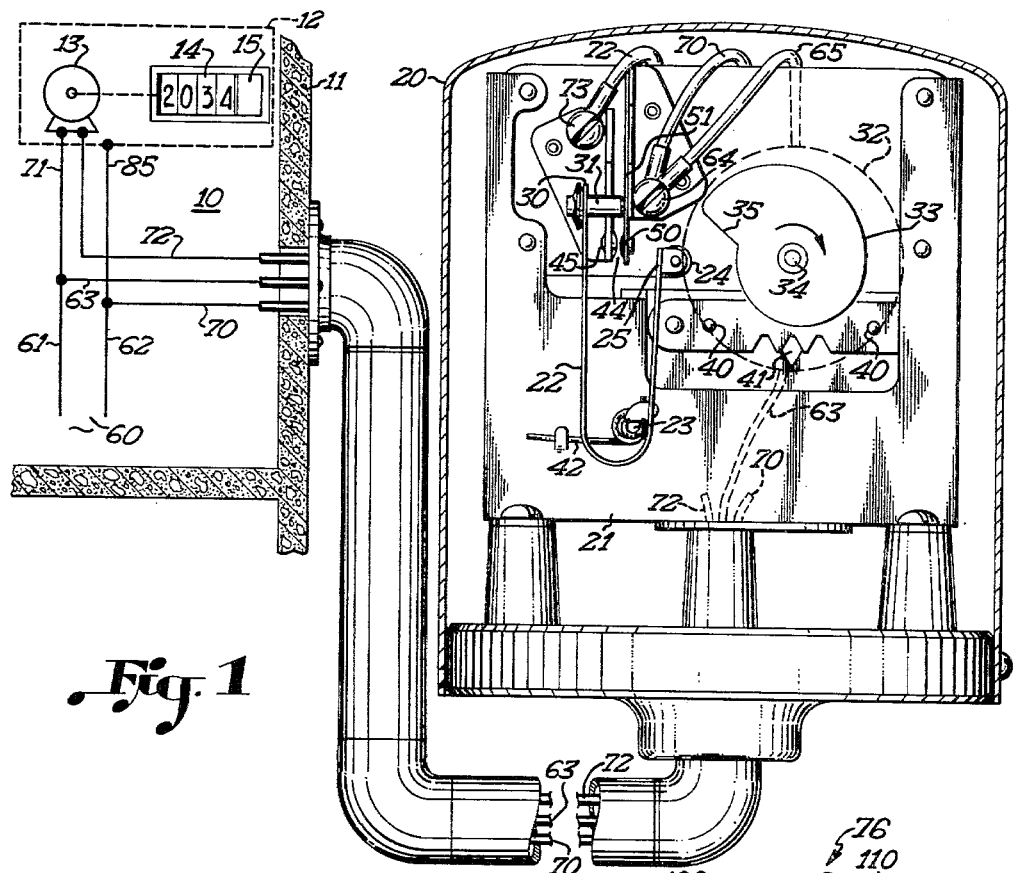
FIGURE 1 is a schematic representation of the invention showing the indoor counting apparatus and the outdoor time-temperature integrating device.

Contained inside in a space 10 of a building 11 is an indicating or counting device 12. Device 12 has a conventional, constant speed motor 13 which is connected to a conventional counting mechanism 14 which indexes numbers in sequence in an increasing manner at a given rate upon the energization of motor 13. Visibly located on device 12 is a flag or power failure indicating device 15 which might be painted red to be readily visible when in the position as shown to cover a portion of the window through which the numbers of the counting mechanism are seen.

The counting device 12 is connected to an outdoor unit 20 which is positioned to respond to the outdoor weather conditions such as air temperature, wind velocity and the presence of sunshine to a degree similar to the average building. Unit 20 has a base 21. A bimetal 22 is pivotally supported on base 21 by a shaft 23. The bimetal has a U-shape with a cam rider roller 24 connected at one end 25 of the bimetal. The other end 30 of the bimetal has a push rod member 31 connected thereto. A conventional, constant speed motor 32 has a cam 33 connected to an output shaft 34. Cam 33 is of a C-shaped type with an outside surface moving closer to the center shaft 34 throughout the 360° rotation between a vertical rising portion 35 which provides a definite step in the cam. The assembly of motor 32 and cam 33 can be moved toward or away from the cam rider 24 by loosening a pair of screws 40 which hold the motor to base 21. A diamond shaped opening 41 formed by a saw tooth type edge on both base 21 and the motor mounting is provided for receiving a screwdriver to adjust the position of motor 32 in a fine manner before screws 40 are tight.

A spring 42 connected between bimetal 22 and base 21 pivots the bimetal in a clockwise direction about shaft 23 to hold rider 25 against the surface of cam 33 and member 31 against a blade 51 depending upon which hit the sooner.

A switch 44 comprises a fixed contact 45 which is mounted on base 21 and a movable contact 50 which is connected to base 21 by flexible spring or blade 51. The position of the movable contact is determined by the force applied to the spring from the bimetal through rod 31. When rider 24 is moved to the right, rod 31 can move to the right to engage spring 51 and lift contact 50 to open switch 44.

A source of power 60 is provided inside building 11. Connected to the source are conductors 61 and 62. Motor 32 is constantly energized from source 60 by a circuit which is traced as follows: from conductor 61, a conductor 63, motor 32, a conductor 65, a terminal 64, a conductor 70, and back to conductor 62. Terminal 64 is connected through spring 51 to movable contact 50 of switch 44.

Motor 13 is energized when switch 44 closes by source 60 through a circuit traced as follows: from conductor 61, a conductor 71, motor 13, a conductor 72, terminal 73, which is associated with the fixed contact 45 of switch 44, terminal 64, conductor 70, and back to the source of power through conductor 62. Whenever switch 44 is closed, constant speed motor 13 is energized to increase the count on counter 14.

The energization of motor 32 adds a certain amount of heat to the outdoor unit 20. As the outdoor temperature drops, and bimetal 22 drops in temperature for a given position of rider 24, member 31 moves to the left to allow the movable portion 50 of switch 44 to be closer to the fixed contact 45. Such an operation would keep switch 44 closed for a greater percent of time. As the rider 24 engaged the outer surface of cam 33 depending upon the temperature of bimetal 22, switch 44 is closed. The amount of time which switch 44 is closed is closely related to a time-temperature integration of the outdoor temperature and other weather conditions since the heat loss of unit 20 is affected by the wind passing over the outer surface and the effect of the heat of the sun.

Figure 2:
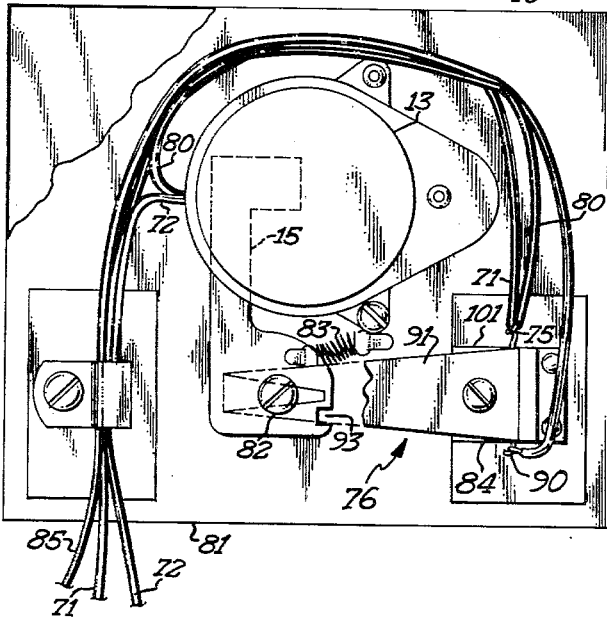
FIGURE 2 is a back view of the indoor counting device of FIGURE 1 showing the power failure indicating means.

Counter 12 is shown in more detail from the back side in FIGURE 2. The internal circuitry on base 81 which connects motor 13 to the source is traced as follows: from conductor 71, terminal 75, a conductor 80, motor 13 and back through conductor 72.

A power failure indication device 76 is shown in detail in FIGURE 2. Flag 15 is pivoted about a base 81 on a shaft 82 to move in a clockwise direction as shown in FIGURE 2 under the force of a bias spring 83 connected between the flag and the base. As shown in FIGURES 1 and 2, the flag is in the unlatched position. When power is connected to the power failure portion of counter 12, a heater 84 is energized through a circuit traced as follows: from conductor 62 of the source of power as shown in FIGURE 1, a conductor 85 as shown in FIGURE 1 and FIGURE 2, a terminal 90, heater 84, terminal 75, and through conductor 71 to the other side of source of power 61. Associated with heater 84 is a bimetal latching device 91 which has a tab 92 for cooperating with a notch 93 in the lower portion of flag 15. When the flag is moved to a cocked or latched position by manually moving the flag in a counter clockwise direction tab 92 can snap into notch 93. When bimetal 91 is energized, the tab 92 is urged in a position to hold the flag in the last mentioned position.

On a power failure, heater 84 is de-energized and the bimetal begins to cool. Since the bimetal requires some time to cool, the flag 15 is not unlatched on short duration power failure.

Figure 3:
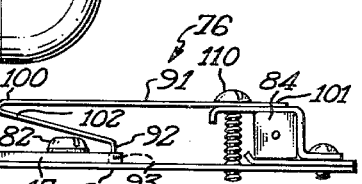
FIGURE 3 is a side view of the temperature responsive latching device used in the power failure indicator of FIGURE 2.

Referring to FIGURE 3, a side view of the power failure, indicating device, latching mechanism is shown. Bimetal 91 has a straight portion 100 extending from an end 101 which is attached to base 81 at heater 84 and a reverse bent section 102 which has tab 92 at the far extreme end. By the proper design of bimetal 91, the movement of tab 92 is only affected by a change in temperature of the bimetal due to the heat from heater 84. Any change in temperature of the bimetal portions 100 and 101 due to ambient temperature does not affect the position of tab 92. With such a device, where the counter 12 may be mounted in unheated buildings, the ambient temperature has no effect upon the power failure indicating device.

*Operation*

Upon energizing the apparatus as shown in FIGURE 1 from the source of power 60, motor 32 begins to operate to drive cam 33 in a clockwise direction at a constant speed. Heater 84 of FIGURE 2 is energized, and as soon as bimetal 91 reached a certain temperature, tab 92 is urged in a direction to be received by notch 93 when flag 15 is manually moved in a counter clockwise direction as shown in FIGURE 2 or to the right as shown in FIGURE 1. The flag would be hidden by the opening around visible counter 14. As rider 24 moved end 25 of the bimetal 22, the control point of the bimetal operated switch 44 is changed. The outdoor weather conditions would affect the temperature in unit 20. Bimetal 22 bends to move end 30 to the left upon a drop in temperature. The combined effects of the movement of the bimetal to temperature and the position of rider 24 with respect to the cam surface 33 provides a time-temperature integration which closes switch 44 by an amount representative of the temperature of unit 20. Each time switch 44 closed, motor 13 is energized at a constant speed to move counter 14 in an increasing manner.

By recording the number of counter 14, and subtracting the number from a subsequent number read after a number of days, a count indicative of the heating load representative of the average building is obtained. By means of the artificial heat given to unit 20 by motor 32, the outdoor unit 20 does not have a signal only indicative of time and temperature. The temperature of the outdor unit will be slightly increased above the outdoor temperature and the effects of wind and sun can have some effect upon the final signal obtained from the operation of switch 44.

As long as the heater 84 of FIGURE 2 is energized, the flag stays in the latched position with tab 92 in notch 93 to hold the flag in a position to the left against the force of spring 83. On a power failure which extended over a considerable period of time as determined by the design of the power failure device, bimetal 91 is cooled to unlatch the flag by lifting tab 92 from notch 93. The flag moves to the position as shown in FIGURE 2 under the force of spring 83. Obviously, if the power failure of a certain period of time didn't present an unappreciable error in the total count of counter 14, there is no need to trip the flag 15. By the adjustment of the size of heater 84 and the bimetal 91, the power failure device could be insensitive to nuisance failures of power which might be quite prevalent in the type of installations in which this particular invention is used. The time required for the power off flag to trip is determined by the cold distance between tab 92 and the flag. The distance is adjustable by turning a mounting screw 110 between heater and tab.

While the invention has been described in one particular manner, the intent is to limit the scope of the invention only by the appended claim.

I claim:

In a fuel demand meter for indicating the needs for fuel of a building over a predetermined period, an outdoor unit having a constantly energized cycling means, a temperature responsive switch means responding to the temperature of said outdoor unit, means connecting said cycling means to vary the control point of said temperature responsive means so the time of operation of said temperature responsive switch means is indicative of the temperature of said outdoor unit, a motor driven counter, means connecting said switch means to control the energization of said counter depending upon the total time said switch means is closed, a power failure indicating means comprising a flag which is pivoted about a base member to be spring biased in a first position, a bimetal operated latching means, a heater associated with said bimetal latching means, means connecting said heater to said source of power whereby upon energization of said heater said bimetal operated latching means holds said flag in a second position when manually reset against the force of said spring whereby upon power failure said bimetal latching means unlatches said flag to provide a power failure indication after a period of time determined by the time required for said bimetal to cool and move to an unlatching position.

References Cited by the Examiner

UNITED STATES PATENTS

| | | | |
|---|---|---|---|
| 1,935,093 | 11/33 | Keller | 340—253 |
| 1,955,155 | 4/34 | Toewe | 340—253 X |
| 2,056,690 | 10/36 | Slye | 235—92 |
| 2,258,457 | 10/41 | Kimball | 236 |
| 2,652,724 | 9/53 | Hidy | 73—343.5 X |
| 2,663,858 | 12/53 | MacInnes et al. | 340—253 |
| 2,671,208 | 3/54 | Lamb | 340—253 |
| 2,702,843 | 2/55 | Taylor | 200—136.3 |
| 2,744,337 | 5/56 | Raney | 200—136.3 X |
| 3,050,601 | 8/62 | Bohn | 236 |
| 3,062,447 | 11/62 | Quinn | 200—136.3 X |

MALCOMB A. MORRISON, *Primary Examiner.*